Figure 1:
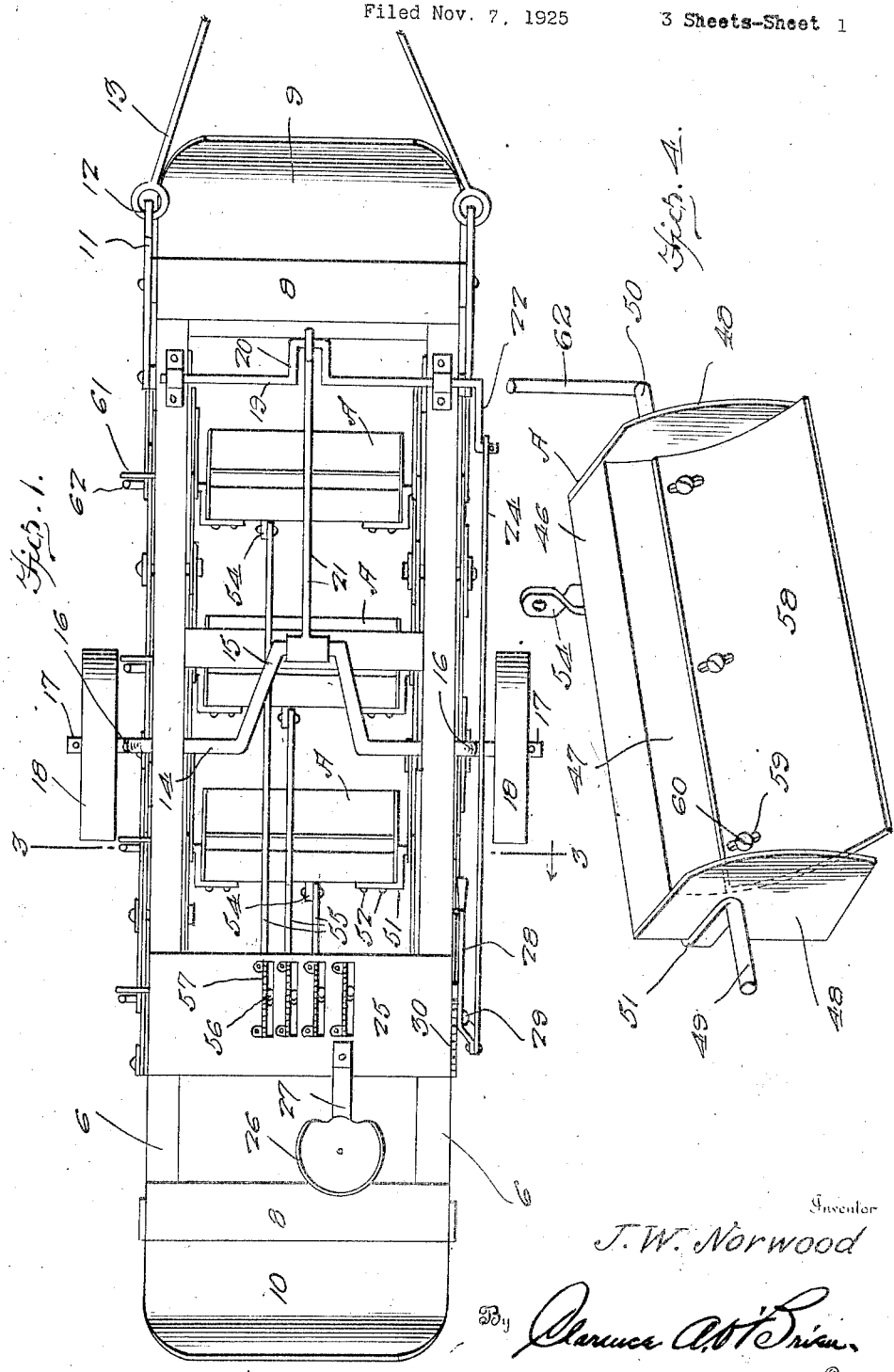

Aug. 10, 1926.

J. W. NORWOOD

LAND LEVELER

Filed Nov. 7, 1925

1,595,215

3 Sheets-Sheet 1

Aug. 10, 1926.

J. W. NORWOOD 1,595,215

LAND LEVELER

Filed Nov. 7, 1925

3 Sheets-Sheet 2

Aug. 10, 1926.

J. W. NORWOOD
LAND LEVELER
Filed Nov. 7, 1925

1,595,215

3 Sheets-Sheet 3

Inventor
J. W. Norwood
By Clarence A. O'Brien
Attorney

Patented Aug. 10, 1926.

1,595,215

UNITED STATES PATENT OFFICE.

JOHN W. NORWOOD, OF LA MESA, NEW MEXICO, ASSIGNOR OF ONE-HALF TO HERBERT E. STEVENER, OF LA MESA, NEW MEXICO.

LAND LEVELER.

Application filed November 7, 1925. Serial No. 67,576.

The present invention relates to a land leveler and has for its principal object to provide a simple construction which is both strong and durable, one which is thoroughly reliable and efficient in operation, and not likely to easily become out of order.

Another important object of the invention is to provide a land leveler of this nature having a plurality of important adjustments so as to be capable of being adapted to various conditions which may be met in leveling the land.

Another very important object of the invention is to provide an apparatus of this nature including a frame mounted on wheels and adjustable on the wheel supporting structure so as to be raised or lowered in relation to the ground for the purpose of placing the scraping elements carried by the frame in an operative or inoperative relationship with the ground.

Another important object of the invention is to provide an apparatus of this nature including a frame with a plurality of scraper elements mounted therein each scraping element having an independent adjusting means.

Another very important object of the invention is to provide a scraping element for an apparatus of this nature which includes a pan having a curved faced block with a curved blade adjustable on said face.

Another very important object of the invention is to provide an apparatus of this nature including a frame having curved skid plates extending forwardly and rearwardly from the respective ends thereof, said frames being supported intermediate its ends on a wheeled structure.

A further important object of the invention is to provide an apparatus of this nature having superior compactness and convenience and wherein a seat is provided on the frame and a plurality of adjustment levers are located within the reach of an operator on said seat, so that the entire apparatus may be most conveniently controlled.

Another very important object of the invention is to provide an apparatus of this nature having a frame with a plurality of bearings mounted therein and capable of being adjusted longitudinally of the frame for the purpose of rotatably receiving scraping elements.

With the above and numerous other objects in view as will appear as the description proceeds, the invention resides in certain novel features of construction, and in the combination and arrangement of parts as will be hereinafter more fully described and claimed.

In the drawing—

Figure 2:
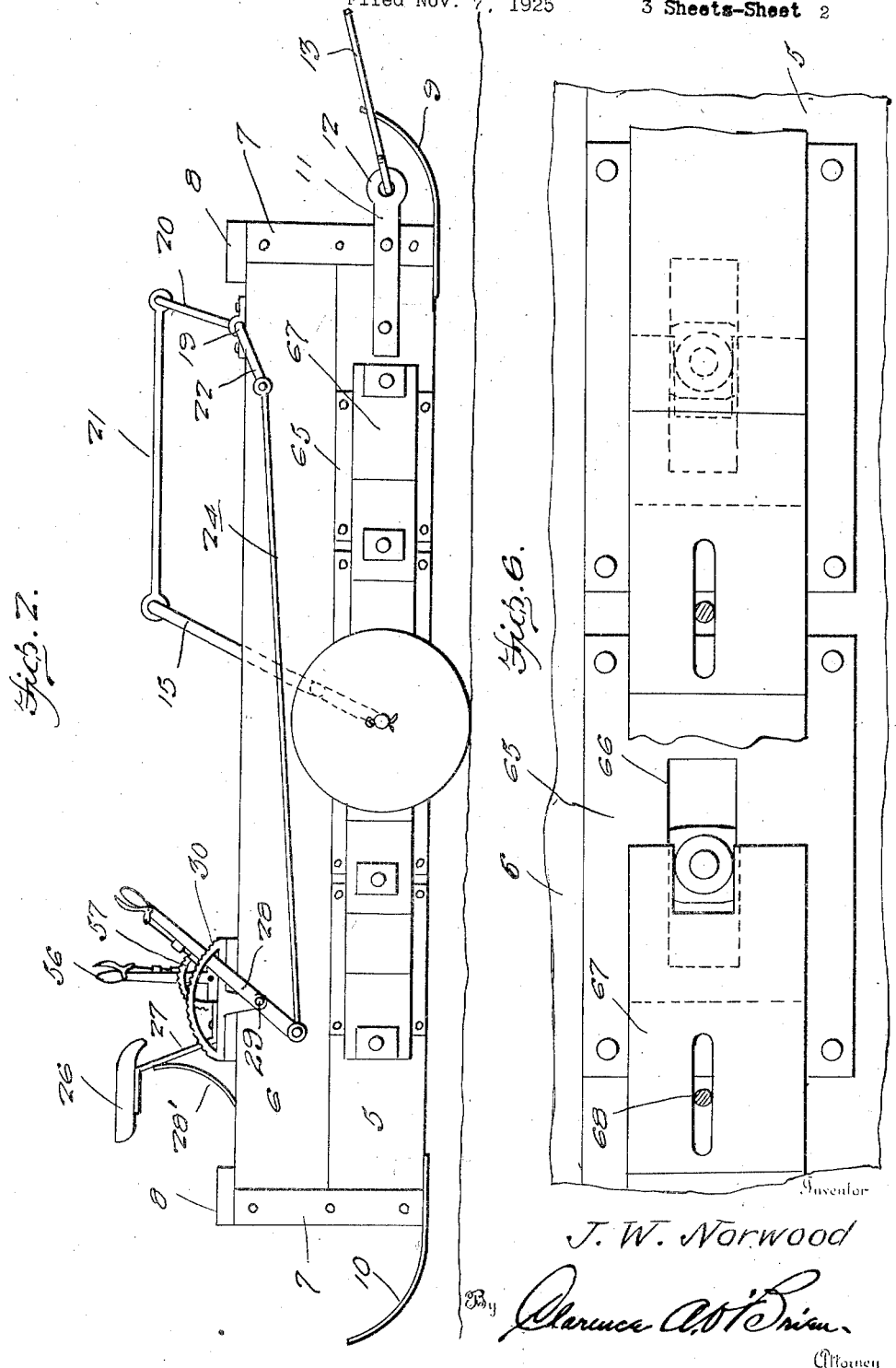
Figure 3:
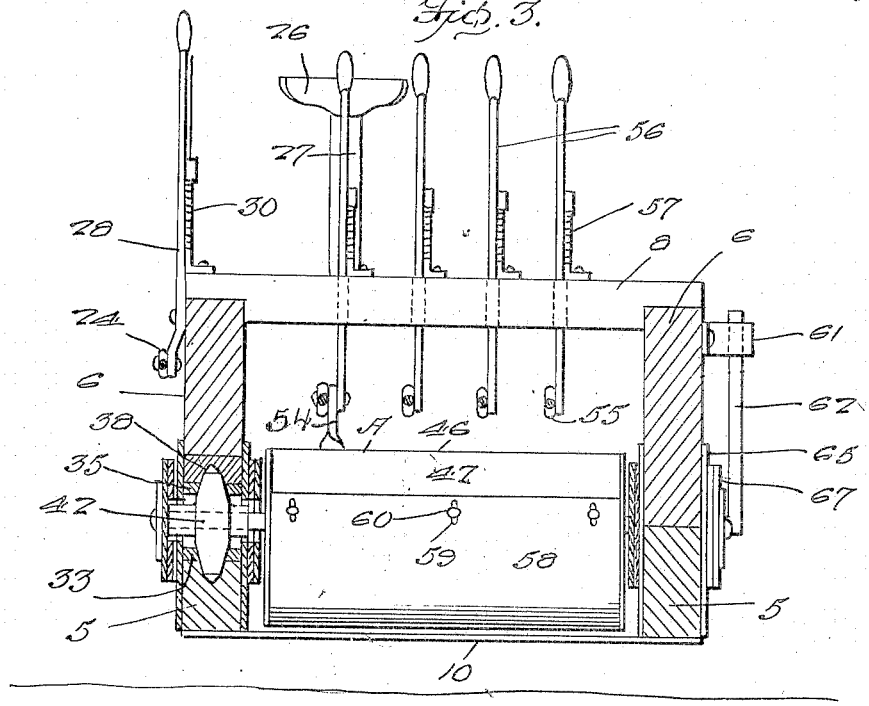
Figure 5:
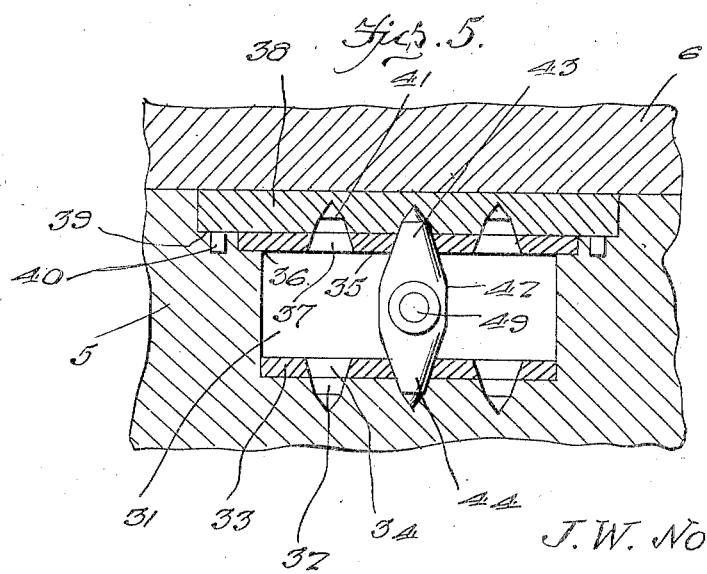

Figure 1 is a top plan view of the land leveler embodying the features of my invention, Fig. 2 is a side elevation thereof, Fig. 3 is a transverse vertical section taken therethrough substantially on the line 3—3 of Fig. 1, Fig. 4 is a detail perspective view of one of the scraping elements, Fig. 5 is an enlarged fragmentary longitudinal section through one side beam of the frame showing a bearing and its mounting, and Fig. 6 is an enlarged fragmentary elevation of one side of the frame illustrating particularly the bearing mountings.

Referring to the drawings in detail, it will be seen that the frame of my improved machine includes a pair of longitudinally extending parallel spaced sides. Each side includes a lower beam 5 and an upper beam 6, connected by straps 7 at their ends. The sides are connected at their ends by bars 8. The side are also connected at their bottoms and at their ends by curved skid plates 9 and 10 extending forwardly and rearwardly respectively from the machine.

Brackets 11 extend from the side of the machine forwardly thereof and terminate in eyes 12 for receiving rods 13 adapted to be engaged in any suitable manner with draft means such as a tractor. A crank shaft 14 is journaled transversely through the sides of the machine and is provided with a central crank 15 and end cranks 16, the latter of which terminates in axle extensions 17 on which are journaled wheels 18. Obviously by rocking the crank shaft 14, the frame may be lowered or raised with respect to the ground.

Crank shaft 19 is journaled on the upper edges of the beams 6 at their forward ends and has a central crank 20 operatively engaged with the central crank 15 by a rod 21. At one end of the crank shaft 19, there is provided a crank 22 which is engaged by a rod 24. A platform 25 extends across the upper edges of the beams 6. A seat 26 is mounted on the shank 27 which is attached to the platform 25. A spring 28' bears against the shank 27 to function as a brace therefor. A lever 28 is pivoted intermediate its ends as at 29 to one of the beams 6. The rod 24 is engaged with this lever 28 so that upon swinging the lever 28, the frame may be raised by pulling on the rod 24, rocking the shaft 19, pulling on the rod 21, and rocking the shaft 14. The usual notched quadrant 30 is associated with the lever 28 for holding said lever in different adjusted positions.

A plurality of notches or recesses 31 are provided in the upper edges of the beams 5. In each notch 31, there are provided at the bottom thereof indentures 32. Plates 33 are mounted on the bottoms of the recesses 31 and having openings 34 therein registering with the indentures 32. A plate 35 extends over each recess 31 having its end seated on the shoulders 36 thereof. Each plate 35 is provided with a plurality of apertures 37. Blocks 38 extend over the plates 35 having their ends resting on shoulders 39 and provided with pegs 40 extending into suitable indentures provided in said shoulders 39. These blocks 38 are provided with upwardly extending indentures 41 registering with the openings 37. A bearing 42 is adapted to be disposed in each recess 31 and is provided with upper and lower extensions 43 and 44 respectively adapted to pass through openings 37 and 34 respectively and into indentures 41 and 32 respectively.

As is shown to advantage in Fig. 5, one indenture 41 and one opening 37 are disposed above each opening 34 and each indenture 32 and thus the bearing 42 may be adjusted either forwardly or rearwardly of the sides of the machine depending upon which of the indentures the extensions thereof are engaged in. This adjustment is one that will seldom be made.

A plurality of scrapers indicated generally by the letters A are mounted between the sides of the frame. These scrapers are identical in construction and a detailed description of one will suffice for all.

Referring to one of the scrapers in detail, it will be seen that 46 represents a block having the front face 47 thereof curved downwardly and forwardly. Plates 48 are mounted on the ends of the block 46 and extend forwardly thereof. A pair of trunnions 49 and 50 project from the ends of the scraper. These trunnions are mounted on angular shanks 51 which extend along the plates 45 and partially along the rear face of the block 46, being attached to said face by suitable fastening elements 52. The trunnions 49 and 50 are rotatably receivable in bearings 42 so that the scrapers extend transversely of the machine between the sides thereof. An arm 54 is attached to the rear face of each block 46 and terminates above the upper surface thereof. These arms 54, as is apparent in Fig. 1, are spaced at different distances from the sides of the frame. Connecting rods 55 are pivotally engaged with the arms 54 and with levers 56 pivotally mounted in the platform 25 and having notched quadrants 57 associated therewith.

It will be apparent that by swinging the levers 56, the angle of the scrapers A may be adjusted. On the curved front face 47 of each block 46 there is mounted a curved scraper blade 58 having slots 59 therein. Screws 60 or similar fastening elements pierce the slots 59 and extend into the block 46 in order to adjustably mount the blade on the block.

A plurality of stops 61 are mounted on the outer side of one beam 6 for engagement by an arm 62 projecting upwardly from each trunnion 50 and rigidly or integrally attached thereto, so that the swinging of the scrapers in one direction is limited. The plate 65 is mounted on each beam 5 adjacent each recess 31 and has a slot 66 therein through which access may be had to the bearing in said recess for the purpose of lubrication, repair, and the like. Cover plates 67 are adjustable on bolts 68 to overlap each other and close the slots 66 of the plates 65.

It is thought that the construction, operation, and advantages of this invention will now be clearly understood without a more detailed description thereof. The present embodiment of the invention has been disclosed merely by way of example since it possesses the superior compactness and convenience mentioned above and the other features of advantage enumerated in the statement of the invention and the above description.

It is apparent that numerous changes in the details of construction and in the combination and arrangement of the parts may be resorted to without departing from the spirit or scope of the invention as hereinafter claimed, or sacrificing any of its advantages.

Having thus described my invention, what I claim as new is:—

1. A land leveler of the class described including, in combination, a frame comprising a pair of parallel longitudinally extending spaced sides, a plurality of scraper units mounted between the sides, each scraper unit comprising a block having a forward curved face, end plates on the block extending forwardly thereof, a curved scraper blade movably mounted on the curved front face of the block, means for holding said blade in different adjusted positions on said face, trunnions extending from each unit, bearings adjustably mounted in the sides of the frame, and means for independently adjusting the units.

2. A land leveler of the class described including a frame having a pair of parallel spaced longitudinally extending sides, each side including a pair of beams, the lower beams having recesses therein and provided with indentures in their bottoms, plates on the bottoms of the recesses provided with apertures registering with the indentures, plates receivable over the recesses and having apertures registered with the apertures of the first plates, blocks restable on the second plates and having indentures registering with the apertures of the second plates, a plurality of bearings having upper and lower extensions adapted to be disposed through the apertures and in the indentures, trunnions journaled in said bearings, and scraper units mounted on said trunnions.

3. A land leveler of the class described including a frame having a pair of parallel spaced longitudinally extending sides, each side including a pair of beams, the lower beams having recesses therein provided with indentures in their bottoms, plates on the bottoms of the recesses and provided with apertures registering with the indentures, plates receivable over the recesses and having apertures registered with the apertures of the first plates, blocks restable on the second plates and having indentures registering with the apertures of the second plates, a plurality of bearings having upper and lower extensions adapted to be disposed through the apertures and in the indentures, trunnions journaled in said bearings, scraper units mounted on said trunnions, each scraper unit including a block having a front curved face, end plates on the block, and a scraper blade of curved construction adjustably mounted on said curved face.

In testimony whereof I affix my signature.

JOHN W. NORWOOD.